(12) United States Patent
Li et al.

(10) Patent No.: US 8,395,899 B2
(45) Date of Patent: Mar. 12, 2013

(54) ELECTRONIC DEVICE HAVING LOCKING MECHANISM FOR BAFFLE PLATE

(75) Inventors: Xiao-Zheng Li, Shenzhen (CN); Si-Wen Shu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 226 days.

(21) Appl. No.: 13/048,882

(22) Filed: Mar. 16, 2011

(65) Prior Publication Data

US 2012/0155033 A1 Jun. 21, 2012

(30) Foreign Application Priority Data

Dec. 15, 2010 (CN) .......................... 2010 1 0591315

(51) Int. Cl.
*H05K 7/16* (2006.01)
*H05K 7/00* (2006.01)
*A47B 81/00* (2006.01)

(52) U.S. Cl. ... 361/726; 361/725; 361/727; 361/679.33; 361/679.37; 361/679.38; 361/679.39; 312/223.1; 312/223.2

(58) Field of Classification Search .. 361/679.31–679.4, 361/679.55–679.6, 724–727; 312/223.1, 312/223.2; 369/75.11, 75.21, 76, 77.11, 369/77.21, 78, 79, 80, 81, 82
See application file for complete search history.

(56) References Cited

U.S. PATENT DOCUMENTS

| | | | |
|---|---|---|---|
| 6,728,109 B1 * | 4/2004 | Wu | 361/747 |
| 2004/0074082 A1 * | 4/2004 | Kim et al. | 29/603.03 |
| 2006/0034048 A1 * | 2/2006 | Xu | 361/685 |

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

An exemplary electronic device includes a housing and a baffle plate. The housing includes first and second side walls with a passage defined therebetween for a functional module to extend through. A flexible plate is secured on the second side wall. A button and a block protrude from the flexible plate towards the passage. A button slot and a positioning slot are defined in the second side wall. The baffle plate has a fixing end pivotally fixed on the first side wall and a free end which is able to reach the second side wall and obstruct the passage. A positioning tab is formed on the free end. When the free end reaches the second side wall, the positioning tab extends into the positioning slot, and the block extends into the positioning slot and blocks the positioning tab to prevent the baffle plate from vibration.

20 Claims, 5 Drawing Sheets

ELECTRONIC DEVICE HAVING LOCKING MECHANISM FOR BAFFLE PLATE

BACKGROUND

1. Technical Field

The present disclosure relates generally to electronic devices, and more particularly to an electronic device having a locking mechanism for locking a baffle plate accommodated in the electronic device.

2. Description of Related Art

Nowadays electronic devices such as servers include a plurality of functional modules such as CD-ROM (compact disk-read only memory) drives to expand the functions of the electronic devices. However, these functional modules may or may not be used frequently. If the functional modules are permanently installed in an electronic device, the cost of the electronic device is increased, and the electronic device may be uncompetitive in the marketplace. Therefore, typically, the functional modules are installed in an electronic device by way of plug-and-play. This means the functional modules are installed in the electronic device when required, and detached from the electronic device when not required.

In addition, when the power consumption of an electronic device during use increases, this can result in a quick rise in the temperature of the electronic device. A typical electronic device is equipped with a fan module, to provide forced cooling airflow to cool electronic components in the electronic device. When a functional module is not currently installed in the electronic device, a baffle plate is needed to guide the cooling airflow along a predetermined channel to reach locations where it is needed. An additional consideration is that the baffle plate is not able to function as a baffle when the functional module is installed in the electronic device. Typically, the baffle plate is secured to the electronic device by a hinge and a torsion spring. When the functional module needs to be installed in the electronic device, the baffle plate rotates to provide a passage for the installation of the functional module. When the functional module is detached and removed from the electronic device, the baffle plate rotates to close off the passage. Thus when in the closed position, the baffle plate prevents the cooling airflow from exiting through the passage, and simultaneously guides the cooling airflow along the predetermined channel to where the electronic components are located. However, a disadvantage of such a baffle plate is that it may easily vibrate and cause noise when buffeted by the airflow.

What is needed, therefore, is an improved electronic device which can overcome the above-mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views, and all the views are schematic.

DETAILED DESCRIPTION

Figure 1:
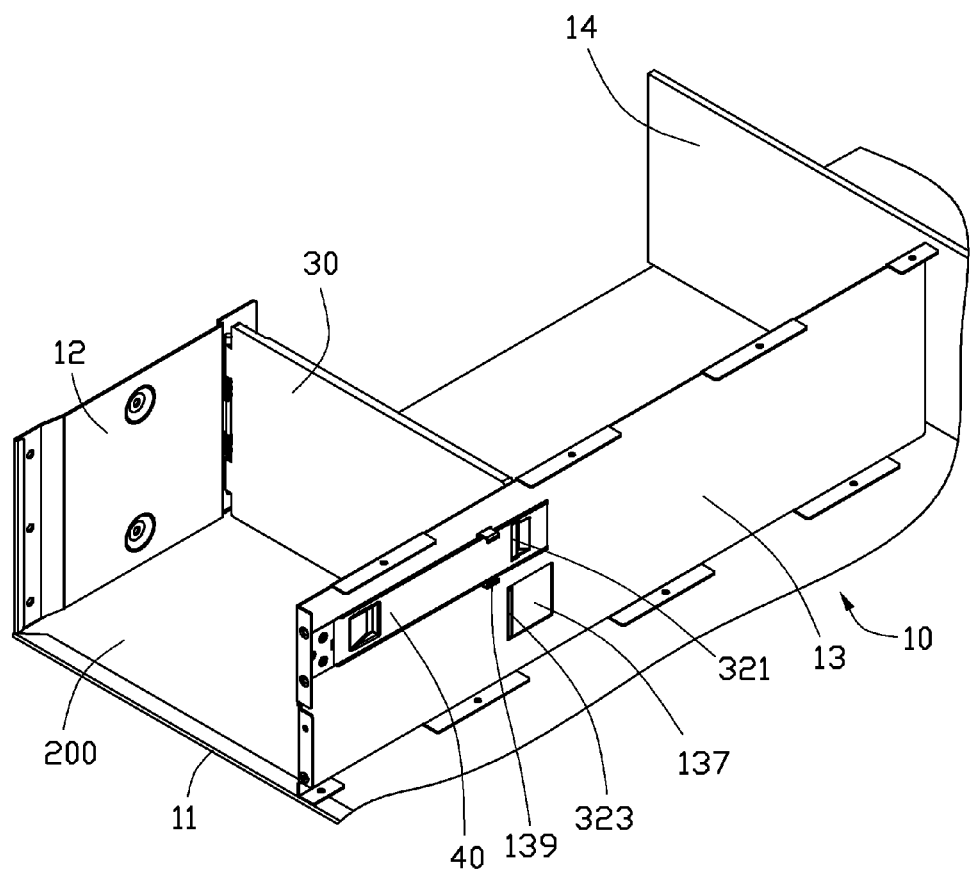
FIG. 1 is an isometric view of an electronic device in accordance with an embodiment of the present disclosure, wherein a baffle plate of the electronic device is in a closed position.
Figure 2:
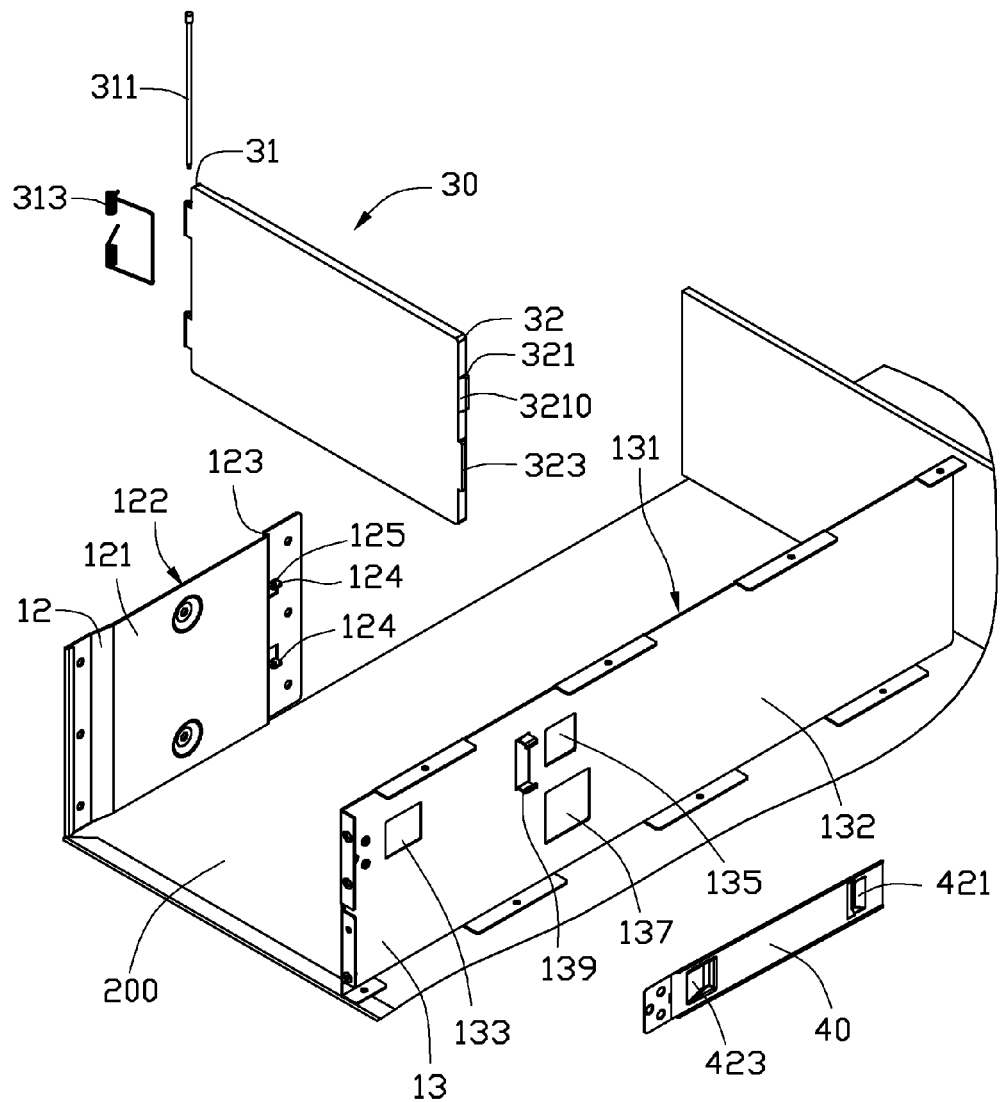
FIG. 2 is an exploded view of the electronic device of FIG. 1.
Figure 5:
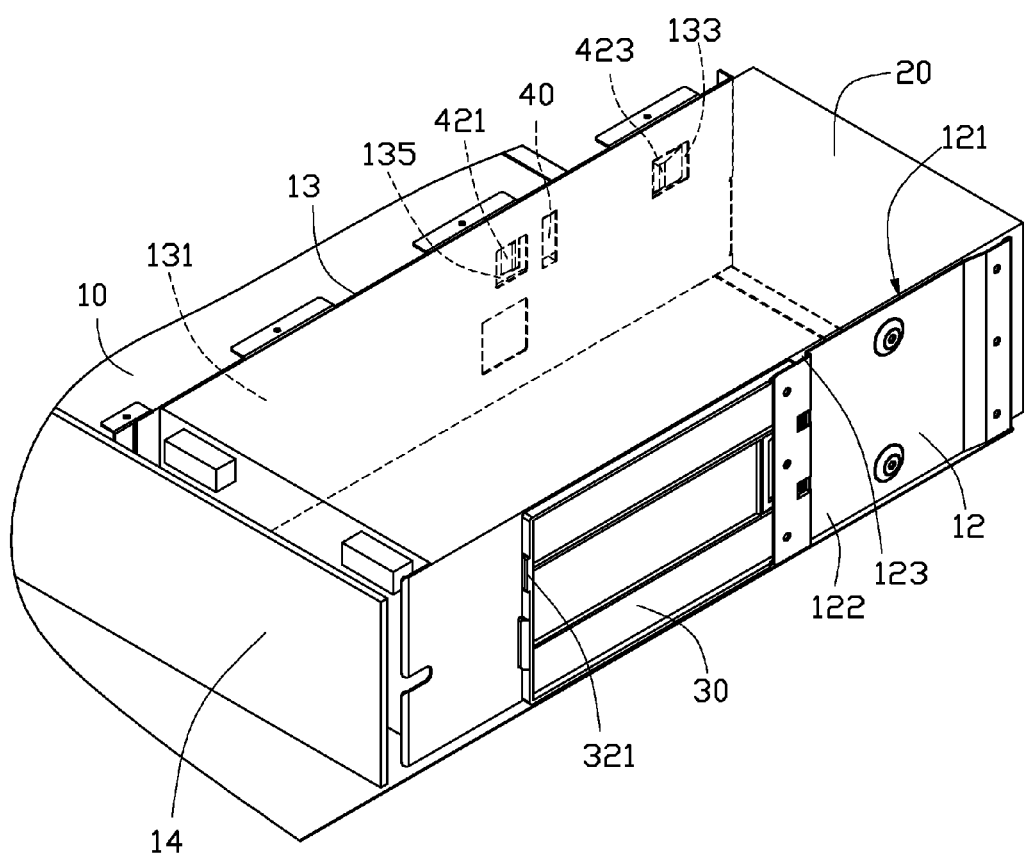
FIG. 5 is an isometric view of the electronic device of FIG. 1, showing a different aspect thereof and showing a functional module installed therein, wherein the baffle plate is in an open position.

Referring to FIGS. 1, 2 and 5, an electronic device in accordance with an embodiment of the present disclosure comprises a housing 10, a functional module 20, a baffle plate 30 and a flexible plate 40. The housing 10 comprises a bottom plate 11, a first side wall 12, a second side wall 13, a top plate (not shown in the drawings for clarity) and a rear plate 14, which cooperatively form a cell (or receptacle). The cell encloses a space for receiving electronic components such as the functional module 20 and other heat-generating electronic components (not shown). The bottom plate 11 is positioned opposite to the top plate. The first side wall 12 is positioned opposite to the second side wall 13. A passage 200 is defined between the first and second side walls 12, 13, for the functional module 20 to extend through when the functional module 20 is installed into the housing 10.

When the functional module 20 is not installed in the electronic device, the baffle plate 30 is in a close position and obstructs the passage 200. In such position, the baffle plate 30 is locked by the flexible plate 40, as shown in FIG. 1. Thus, airflow generated by a fan module (not shown) cannot exit the housing 10 through the passage 200. Instead, the airflow passes through a predetermined channel (not shown) in the housing 10 to reach the locations of the electronic components that need to be cooled. By this means, the airflow of the fan module is utilized adequately. Referring to FIG. 5, when the functional module 20 is installed in the electronic device, the flexible plate 40 is pressed by the functional module 20 to unlock the baffle plate 30, and the baffle plate 30 is pushed by the functional module 20 to align with the first side wall 12 and stand in an open position.

It is noted that the electronic device may further comprise another second side wall neighboring the second side wall 13, another flexible plate secured on the other second side wall, another first side wall positioned opposite to the other second side wall, and another baffle plate positioned between the other first and second side walls to cooperatively form another cell for receiving another functional module. It is understood that the number of cells is not limited in the present disclosure. The surface of the first side wall 12 facing the second side wall 13 is defined as an inner surface 121 of the first side wall 12, and the surface of the second side wall 13 facing the first side wall 12 is defined as an inner surface 131 of the second side wall 13. The surfaces of the first and second side walls 12, 13 which face away from each other are defined as outer surfaces 122, 132 of the first and second side walls 12, 13, respectively.

A step portion 123 is formed on the first side wall 12. The step portion 123 protrudes away from the second side wall 13. Two fixing ears 124, which are used to secure the baffle plate 30, are formed on the step portion 123. The fixing ears 124 extend in a direction perpendicular to the first side wall 12, and are parallel to each other. Each of the fixing ears 123 defines a hole 125 therein.

The baffle plate 30 comprises a fixing end 31 and a free end 32 opposite to the fixing end 31. A shaft 311 and an elastic member 313 are accommodated on the fixing end 31 of the baffle plate 30. The shaft 311 inserts through the elastic member 313 and apertures (not labeled) defined in the fixing end 31, and at the same time through the fixing ears 123 of the first side wall 12 to pivotally secure the baffle plate 30 onto the first side wall 12. The elastic member 313 is a torsion spring. It is understood that in alternative embodiments, the shaft 311 can be integrally formed with the baffle plate 30, and the elastic member 313 can be a resilient plate or the like. With the resilience of the elastic member 313, the baffle plate 30 is able to rotate about the fixing end 31 (i.e., the fixing ears 124 of the first side wall 12), and the free end 32 is able to reach the inner surface 131 of the second side wall 13 to obstruct the passage 200. A positioning tab 321 is formed on the free end 32 to position the free end 32 on the second side wall 13 (this is described in more detail hereinafter).

The flexible plate 40 is secured on the outer surface 132 of the second side wall 13. Also referring to FIG. 3, the flexible plate 40 comprises a main body 42 and a securing end 41. The securing end 41 engages with the second side wall 13 by means such as screws or rivets extending through holes (not labeled) defined in the securing end 41. A button 423 and a block 421 protrude outwardly from the main body 42 towards the passage 200. The button 423 and the block 421 are spaced from each other. The button 423 is near the securing end 41, and the block 421 is far from the securing end 41.

Corresponding to the button 423 and the block 421 respectively, a button slot 133 and a positioning slot 135 are defined in the second side wall 13. The button 423 can extend through the button slot 133. The block 421 can extend through the positioning slot 135.

Figure 4:
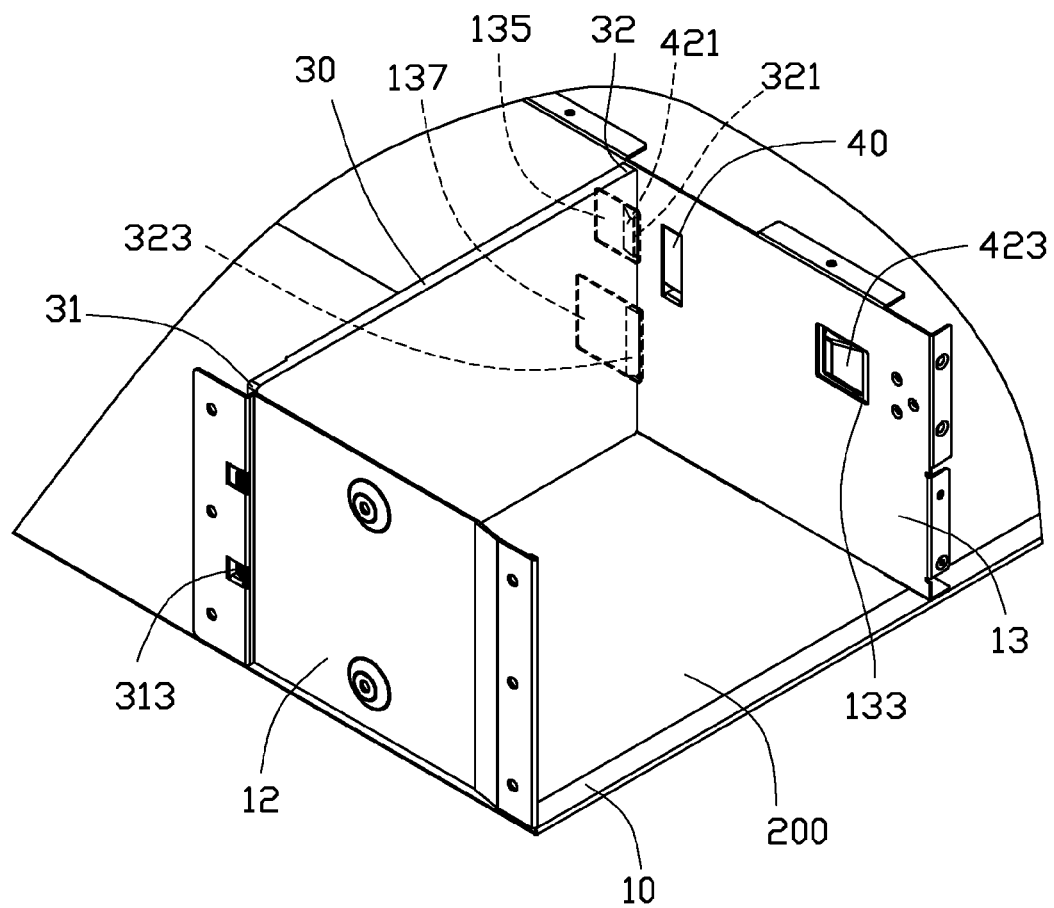
FIG. 4 is an isometric view of part of the electronic device of FIG. 1, showing a different aspect thereof.

In FIGS. 1 and 4, the baffle plate 30 is shown in the closed position, in which it obstructs the passage 200. When the functional module 20 is not received in the passage 200, the baffle plate 30 rotates about the first side wall 12 clockwise due to the resilience of the elastic member 313 until the free end 32 of the baffle plate 30 reaches the second side wall 13 and the positioning tab 321 locks in the positioning slot 135. The positioning tab 321 engaging in the positioning slot 135 prevents continuing clockwise rotating of the baffle plate 30. At the same time, the button 423 of the flexible plate 40 extends through the button slot 133. The block 421 of the flexible plate 40 extends through the positioning slot 135 to block the positioning tab 321, whereby the baffle plate 30 is prevented from rotating anticlockwise. Furthermore, the block 421 resiliently holds the positioning tab 321 against an edge of the second side wall 13 that bounds a front extremity of the positioning slot 135. Thereby, not only is the baffle plate 30 prevented from further rotating clockwise, but also the baffle plate 30 is prevented from vibrating due to any buffeting by the airflow generated by the fan module. Thus, noise caused by the baffle plate 30 is avoided.

Also referring to FIGS. 1, 2 and 4, for further positioning the free end 32 of the baffle plate 30 on the second side wall 13, an additional positioning tab 323 is formed on the free end 32, and an additional positioning slot 137 is defined in the second side wall 13 matching with the additional positioning tab 323. When the free end 32 reaches the second side wall 13, the additional positioning tab 323 locks in the additional positioning slot 137 to prevent continuing clockwise rotating of the baffle plate 30. In particular, the additional positioning tab 323 abuts an edge of the second side wall 13 that bounds a front extremity of the additional positioning slot 137. Thus in the present embodiment, the additional positioning tab 323 augments the function of the block 421, wherein the block 421 resiliently holds the positioning tab 321 and prevents continuing clockwise rotating of the baffle plate 30.

Moreover, referring to FIG. 2, each of the positioning tabs 321, 323 has a substantially trapezoidal cross-section. A main face (not labeled) of the additional positioning tab 323 is coplanar with a clockwise-oriented main face of the baffle plate 30, and a main face (not labeled) of the positioning tab 321 is coplanar with an anticlockwise-oriented main face of the baffle plate 30. Therefore not only are the positioning tabs 321, 323 located one above the other on the free end 32 of the baffle plate 30, but also the positioning tabs 321, 323 can be considered to be staggered from each other. Thus the two positioning tabs 321, 323, which control holding of the baffle plate 30 in two opposite directions, provide the baffle plate 30 with more reliable stability.

It is noted that in alternative embodiments, the positioning tab 321 need only serve to prevent the baffle plate 30 from rotating anticlockwise due to the blocking of the block 421 of the flexible plate 40; and that complementary to the positioning tab 321, the additional positioning tab 323 locking in the additional positioning slot 137 serves to prevent the baffle plate 30 from continuing to rotate clockwise. That is, the block 421 need not be configured to resiliently hold the positioning tab 321 against the front edge of the positioning slot 135 to prevent continuing clockwise rotating of the baffle plate 30. In such alternative embodiments, the positioning tabs 321, 323 are still located one above the other on the free end 32 of the baffle plate 30, and are still staggered from each other. Thus the two positioning tabs 321, 323, which control holding of the baffle plate 30 in the two opposite directions, provide the baffle plate 30 with reliable stability.

Referring to FIG. 5, when the functional module 20 is received in the passage 200, initially, a side wall of the functional module 20 rides along the button 423 and pushes the button 423 outward, so that the button 423 is at least partially disengaged from the button slot 133 of the second side wall 13. As a result, the block 421 is disengaged from the positioning slot 135 of the second side wall 13. Subsequently, an end wall of the functional module 20 pushes the baffle plate 30 and rotates the baffle plate 30 to align with the first side wall 12. Since the baffle plate 30 is positioned on the step portion 123, a major surface of the baffle plate 30 is flush with the inner surface 121 of the first side wall 12, thereby conveniently allowing the functional module 20 to continue to travel further into the passage 200.

Referring to FIGS. 1 and 2 again, a pair of restricting guides 139 is formed on the outer surface 132 of the second side wall 13. In particular, the restricting guides 139 are near the block 421, and far from the securing end 41 of the flexible plate 40. The restricting guides 139 limit movement of an end of the main body 42, thereby assuring that the elastic deformation of the flexible plate 40 occurs within a controlled range. The restricting guides 139 can be formed integrally with the second side wall 13 as a single piece by stamping. For example, in the illustrated embodiment, the restricting guides 139 are in the form of restricting hooks.

In disassembly of the functional module 20, if the speed of withdrawal of the functional module 20 along the passage 200 is too fast, the block 421 of the flexible plate 40 may extend into the positioning slot 135 before the positioning tab 321 of the baffle plate 30 extends into the positioning slot 135. If this were to happen, the block 421 may fail to properly block the positioning tab 321 in the positioning slot 135. Some measures can be taken to prevent this from happening. For instance, a distance between the button 423 and the block 421 can be configured to be appropriately long, with the button 423 near the securing end 41, and the block 421 far from the securing end 41. With such configuration, the time it takes for the functional module 20 to be pulled clear of the button 423 and release the button 423 is extended; and as a result, the time period elapsed before the block 421 is able to extend back into the positioning slot 135 is extended. This provides more time for the baffle plate 30 to return to the closed position and the positioning tab 321 to extend into the positioning slot 135 before the block 421 extends back into the positioning slot 135.

Further, the elastic member 313 can be configured to have large resilience, to reduce the time needed for the baffle plate 30 to return to the closed position and the positioning tab 321 to extend into the positioning slot 135.

Figure 3:
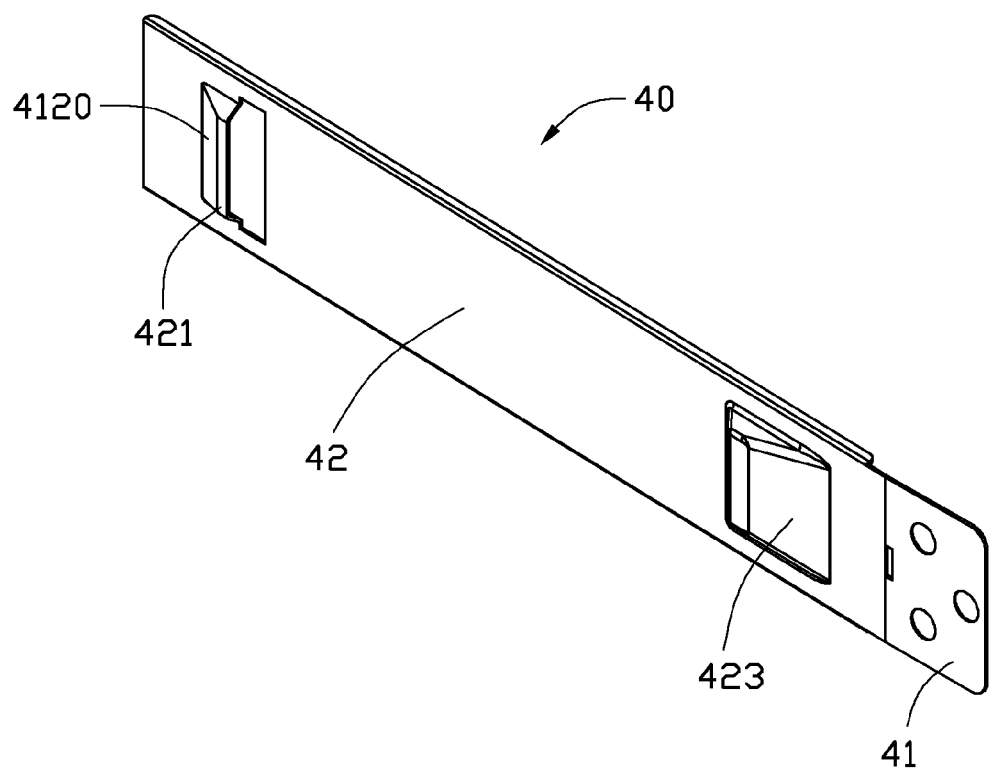
FIG. 3 is an isometric, enlarged view of a flexible plate of the electronic device of FIG. 2.

Moreover, a slanted guiding surface 3210 can be formed on the positioning tab 321 (see FIG. 2), and a slanted guiding surface 4210 can be formed on the block 421 correspondingly (see FIG. 3). The slants of the guiding surfaces 3210, 4210 are complementary to each other. With such configuration, even if the block 421 extends back into the positioning slot 135 before the positioning tab 321 of the baffle plate 30 extends into the positioning slot 135, the positioning tab 321 can still overcome the obstacle of the block 421 with the help of the guiding surfaces 3210, 4210 and continue to a position where the positioning tab 321 extends into the positioning slot 135 and is thereby blocked by the block 421.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device comprising:
a housing for receiving a functional module, the housing comprising a first side wall and a second side wall opposite to the first side wall, a passage being defined between the first and second side walls for the functional module to extend through, a button slot and a positioning slot being defined in the second side wall and being spaced from each other along a direction of insertion of the functional module into the passage;
a baffle plate having a fixing end and a free end, the fixing end being pivotally secured on the first side wall, the baffle plate being elastically biased to rotate about the first side wall to enable the free end to reach the second side wall and obstruct the passage, and a positioning tab being formed on the free end; and
a flexible plate being secured on the second side wall and located on a side opposite to the passage, the flexible plate having a button and a block both protruding towards the passage;
wherein when the free end of the baffle plate rotates in a first direction and reaches the second side wall, the positioning tab extends into the positioning slot and prevents the baffle plate from further rotating in the first direction, the button extends into the button slot, and the block extends into the positioning slot and blocks the positioning tab from moving in a second direction that is opposite to the first direction.

2. The electronic device of claim 1, wherein an additional positioning slot is defined in the second side wall, and an additional positioning tab is formed on the free end of the baffle plate, when the free end reaches the second side wall, the additional positioning tab locks in the additional positioning slot and prevents the baffle plate from further rotating in the first direction.

3. The electronic device of claim 1, wherein the flexible plate comprises a main body and a securing end, the securing end being secured on the second side wall, the button and the block being formed on the main body.

4. The electronic device of claim 3, wherein a pair of restricting guides are formed on the second side wall for restricting the main body of the flexible plate.

5. The electronic device of claim 4, wherein the restricting guides are far from the securing end and near the block.

6. The electronic device of claim 3, wherein the button is near the securing end, and the block is far from the securing end.

7. The electronic device of claim 1, wherein the positioning tab and the block form guiding surfaces thereon complementary to each other.

8. The electronic device of claim 1, wherein a plurality of fixing ears are formed on the first side wall, a shaft and an elastic member are accommodated on the fixing end of the baffle plate, the shaft being inserting through the fixing ears, and the elastic member providing resilience for the baffle plate rotating about the first side wall.

9. The electronic device of claim 1, wherein a step portion is formed on the first side wall, and the fixing end of the baffle plate is secured on the step portion, when the functional module is received in the passage, the baffle plate is align with the first side wall.

10. An electronic device comprising:
a housing comprising a first side wall and a second side wall opposite to the first side wall, a passage being defined between the first and second side walls, a button slot and a positioning slot being defined in the second side wall and spaced from each other along a direction of insertion of the functional module into the passage;
a functional module detachably attached in the passage;
a baffle plate having a fixing end and a free end, the fixing end being pivotally secured on the first side wall, the baffle plate being elastically biased to rotate about the first side wall to enable the free end to reach the second side wall and obstruct the passage, and a positioning tab being formed on the free end; and
a flexible plate being secured on the second side wall and located on a side opposite to the passage, the flexible plate having a button and a block both protruding towards the passage, the button being extendable into the button slot, and the block being extendable into the positioning slot; wherein when the functional module is slid into the passage, the function module pushes the button so that the button is at least partly disengaged from the button slot, and the block thereby disengages from the positioning slot, and the functional module pushes the baffle plate and rotates the baffle plate to a position substantially aligned with the first side wall; and wherein when the functional module is slid out from the passage, the functional module disengages from the baffle plate, the baffle plate rotates about the first side wall, the free end of the baffle plate reaches the second side wall and obstructs the passage, and the positioning tab extends into the positioning slot, and the functional module also disengages from the button so that the button reengages in the button slot, and the block thereby reengages in the positioning slot and blocks the positioning tab from moving in a direction back toward the first side wall.

11. The electronic device of claim 10, wherein an additional positioning slot is defined in the second side wall, and an additional positioning tab is formed on the free end of the baffle plate, when the free end reaches the second side wall, the additional positioning tab locks in the additional positioning slot.

12. The electronic device of claim 10, wherein the flexible plate comprises a securing end and a main body, the securing end being secured on the second side wall, the button and the block being formed on the main body.

13. The electronic device of claim 12, wherein a pair of restricting guides are formed on the second side wall for restricting the main body of the flexible plate.

14. The electronic device of claim 13, wherein the restricting guides are far from the securing end and near the block.

15. The electronic device of claim 12, wherein the button is near the securing end, and the block is far from the securing end.

16. The electronic device of claim 10, wherein the positioning tab and the block form guiding surfaces thereon complementary to each other.

17. The electronic device of claim 10, wherein a plurality of fixing ears are formed on the first side wall, a shaft and an elastic member are accommodated on the fixing end of the baffle plate, the shaft being inserting through the fixing ears, and the elastic member providing resilience for the baffle plate rotating about the first side wall.

18. The electronic device of claim 10, wherein a step portion is formed on the first side wall, and the fixing end of the baffle plate is secured on the step portion, when the functional module is installed into the passage, a major surface of the baffle plate is flush with an inner surface of the first side wall.

19. A locking mechanism for locking a baffle plate in an electronic device, the baffle plate comprising a free end with a positioning tab formed thereon, the locking mechanism comprising:

a side wall in which a button slot and a positioning slot are defined and spaced from each other; and a flexible plate having a main body and a securing end, the securing end being secured on the side wall and located on a side opposite to the baffle plate, a button and a block both protruding from the main body, and the button and the block extending through the button slot and the positioning slot, respectively;

wherein when a function module is slid into the electronic device a pressure is applied on the button in a direction away from the baffle plate, the button moves in the same direction and drives the main body to pull the block out from the positioning slot; and when the pressure on the button is removed, the button elastically rebounds to move in an opposite direction and drives the main body to push the block back into the positioning slot where the block is positioned for blocking the positioning tab from disengaging from the positioning slot.

20. The locking mechanism of claim 19, wherein a pair of restricting guides are formed on the side wall, the restricting guides limiting movement of the main body of the flexible plate in a direction toward an outside of the locking mechanism.

* * * * *